United States Patent [19]

Oelscher

[11] Patent Number: 5,809,054
[45] Date of Patent: Sep. 15, 1998

[54] METHOD FOR STABILIZING AN AC SYSTEM AGAINST REACTIVE-LOAD FLUCTUATIONS, AND A POWER-FACTOR CORRECTION DEVICE

[75] Inventor: Jan Oelscher, Knonau, Switzerland

[73] Assignee: Concast Standard AG, Zurich, Switzerland

[21] Appl. No.: 866,297

[22] Filed: May 30, 1997

[30] Foreign Application Priority Data

Jun. 13, 1996 [DE] Germany ................ 196 23 540.5

[51] Int. Cl.[6] ........................................ H05B 7/148
[52] U.S. Cl. ................ 373/104; 373/108; 323/210
[58] Field of Search .................... 373/102, 104, 373/108; 323/6, 8, 101, 102, 210, 211; 363/70

[56] References Cited

U.S. PATENT DOCUMENTS

| | | | |
|---|---|---|---|
| 4,121,150 | 10/1978 | Kelley, Jr. | 323/102 |
| 4,691,325 | 9/1987 | Boisdon | 373/108 |
| 5,610,937 | 3/1997 | Gaupp | 373/108 |
| 5,617,447 | 4/1997 | Tambe | 373/108 |
| 5,627,454 | 5/1997 | Aebischer et al. | 323/210 |

FOREIGN PATENT DOCUMENTS

| | | |
|---|---|---|
| 0498239A1 | 8/1992 | European Pat. Off. . |
| 0639880A2 | 2/1995 | European Pat. Off. . |
| 0707369A1 | 4/1996 | European Pat. Off. . |
| 4436353A1 | 4/1996 | Germany . |

*Primary Examiner*—Tu B. Hoang
*Attorney, Agent, or Firm*—Burns, Doane, Swecker & Mathis, L.L.P.

[57] ABSTRACT

In operation, DC arc furnaces generate undesired reactive load fluctuations which are compensated for by a power controller without special compensation reactance. In order to permit a melting operation of the arc furnace in weak AC systems the DC furnace is operated with at least two melting electrodes. A current controller is connected to each cathode via rectifiers. Each cathode is controlled with respect to its spacing from a melt by an electrode adjusting device and an electrode controller. Only one current controller one electrode controller are operationally connected, on an input side, to a power factor controller. Power factor control is thus performed with only one electrode assembly.

4 Claims, 3 Drawing Sheets

METHOD FOR STABILIZING AN AC SYSTEM AGAINST REACTIVE-LOAD FLUCTUATIONS, AND A POWER-FACTOR CORRECTION DEVICE

BACKGROUND OF THE INVENTION

1. Field of the Invention

This invention is based on a method for stabilizing a power supply device or an AC system against reactive-load fluctuations of at least one electric load with a variable reactive load, and from a power-factor correction device.

2. Discussion of Background

EP 0 707 369 A1, discloses a method for stabilizing an AC system against reactive-load fluctuations and a power-factor correction device, in the case of which use is made as compensation reactance of inductors which are always present and via which an arc furnace is fed by rectifiers. The rectifiers are controlled by a current controller which is operationally connected on the input and/or output side to the output of a power-factor controller. During operation of the arc furnace, the process produces strong fluctuations in the reactive power which cause optically perceptible flicker phenomena in the feeding AC system in the frequency range of 2 Hz–20 Hz. their strength is a function of the short-circuit power of the AC system and of the connected load.

EP 0 639 880 A2 discloses a method for stabilizing an AC system against reactive-load fluctuations, and a power-factor correction device in the case of which the reactive power is controlled via a special, thyristor-controlled inductor as a function of the total current of the installation (arc furnace and filters). This requires additional, expensive components for power-factor control.

EP 0 498 239 A1 describes a method for controlling the electrodes of a DC arc furnace and an electrode control device, in the case of which, as in the present invention, the output signal of the current controller is fed via a bandpass filter to a summer at the input of an electrode controller. In this case, an electrode controller reference input variable signal can be prescribed by a function generator as a function of desired current intensity for different power factors. Independently of a change in voltage, the arc length is set such that the required current is achieved by means of a prescribed drive level at the rectifier and that thus an adequate control range is always available. No power-factor control is specified.

SUMMARY OF THE INVENTION

Accordingly, one object of the invention, is to provide a novel achievement of the object of developing a method for stabilizing an AC system against reactive-load fluctuations and a power-factor correction device of the type mentioned at the beginning in such a way that the operation of an electric load or of an arc furnace is possible in weak AC systems.

Another advantage of the invention is that the absolute value of the reactive-power fluctuation is reduced.

Another advantageous embodiment of the invention shows that if a plurality of arc furnaces are operated on the same medium-voltage busbar the resulting flicker phenomena become smaller in relation to the connected power than in the case of the same power of an individual installation. This effect is utilized advantageously in the case of a DC arc furnace having a plurality of electrodes, the individual supply assemblies always being simultaneously in operation. At least one electrode assembly is controlled in a conventional way, for example by holding an operating point, while at least one other electrode assembly is used for quick power-factor control. A higher-order control loop ensures observation of the operating points for melting the melting stock. The role of the available electrodes with their power converter assemblies can be exchanged at any time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
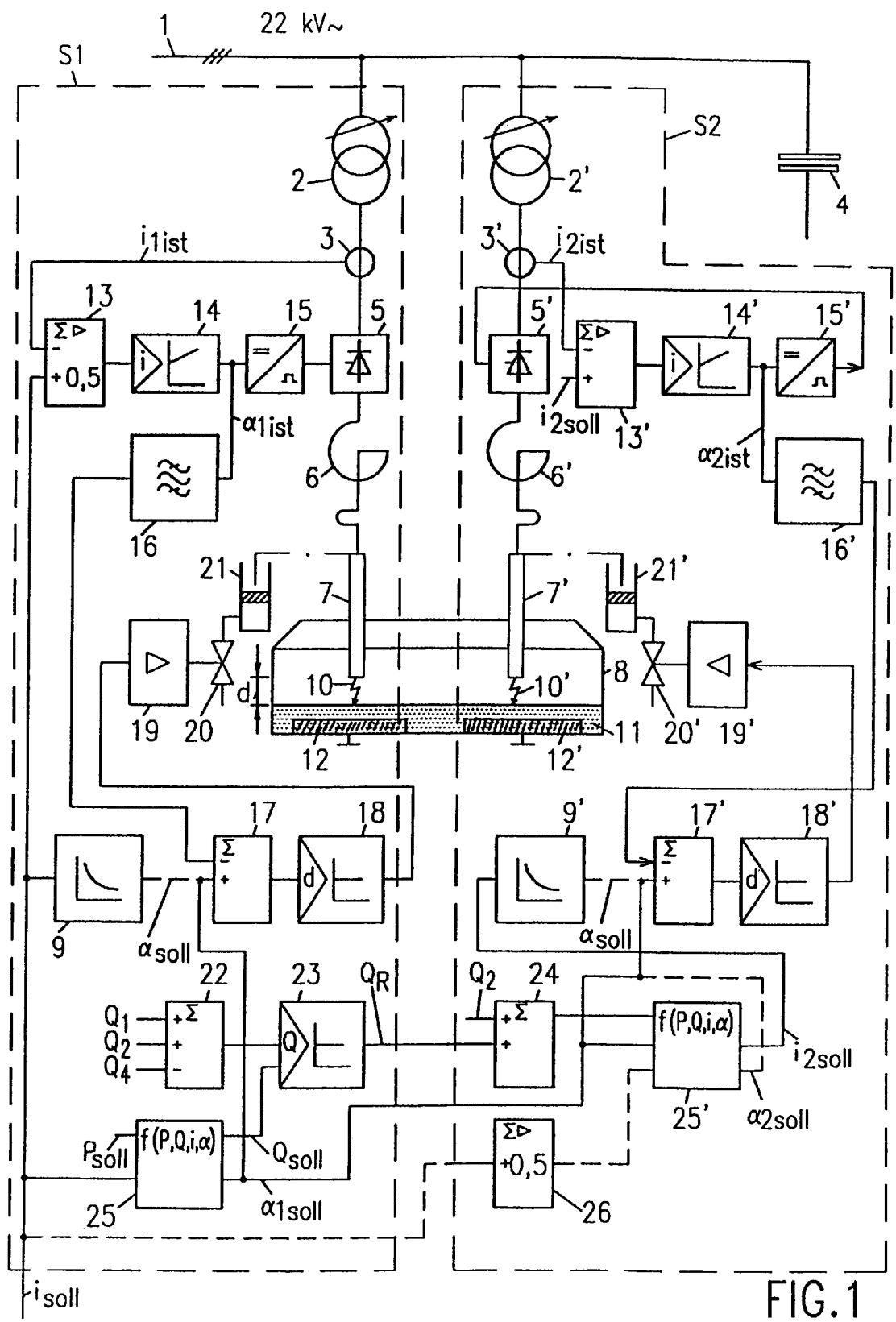
FIG. 1 shows a DC arc furnace having 2 electrodes having a current controller each, an electrode controller each and a common power-factor controller.

Referring now to the drawings, wherein like reference numerals designate identical or corresponding parts throughout the several views and in which, for the sake of simplicity, physical values and signals assigned to them are denoted identically, FIG. 1 shows 2 essentially identically designed component groups or electrode assemblies (S1, S2) which are assigned to 2 electrodes or cathodes (7, 7') of a DC arc furnace (8). The physical quantities of the two electrode assemblies (S1, S2) differ in the indices 1 or 2, the components by reference symbols without a prime in the case of the electrode assembly (S1) or in reference numerals with a prime in the case of the electrode assembly (S2) Essentially only the electrode assembly (S1) is described below in order to avoid repetition.

A furnace transformer (2) having a plurality of switching stages is connected to a 3-phase AC system (1) with an AC voltage of 22 kV, on the one hand, and to the AC voltage input of a power converter or rectifier (5), on the other hand. The DC voltage side of the rectifier (5) is connected via an inductor (6) to a first melting electrode or cathode (7) of the DC arc furnace (8). A counter-electrode or anode (12) arranged in the floor region of the arc furnace (8) is connected to the positive pole of the rectifier (5) (not represented). An arc (10) burns between the lower end of the cathode (7) and the surface of a melt or of a melting bath (11). (d) denotes a spacing between the cathode (7) and the surface of the melting bath (11).

An actual current value signal ($i_{1ist}$) is detected, and fed to a negating input of a summing amplifier (13), by means of a current transformer (3) in the AC supply lead to the rectifier (5). A prescribable desired current value signal ($i_{soll}$) is fed, for example by a potentiometer (not represented), to a non-negating factor input of this summer (13) with the factor 0.5. On the output side, the summer (13) is connected to a current controller (14) with a proportional-plus-integral characteristic, to which it supplies an aggregate signal $0.5 \times i_{soll} - i_{1ist}$. On the output side, the current controller (14)

supplies a rectifier manipulated variable signal ($\alpha_{1ist}$), in accordance with an ignition angle, to an ignition-pulse converter (15) which controls the rectifier (5) on the output side.

Via an attenuator or a bandpass filter (16) for signal matching, limit-value monitoring and the suppression of undesired frequencies, the rectifier manipulated variable signal ($\alpha_{1ist}$) is connected to a negating input of a summer (17) whose non-negating input is fed an electrode controller reference input variable signal ($\alpha_{1soll}$), which can be prescribed by a function generator (25), in accordance with a desired ignition angle value in the range of 10°–65°, preferably in the range of 25°–35°. On the output side, the summer (17) is connected to an electrode controller (18) with a proportional characteristic, which on the output side acts via a valve amplifier (19) on a valve (20) of an electrode-adjusting device (21). The electrode-adjusting device (21), for example a hydraulic pump with an adjusting mechanism and an electrode speed governor, is mechanically coupled to the cathode (7) and permits the latter to be adjusted in height; it acts as a first-order delay element.

The electrode control operates approximately 10 times more slowly than the current control. The height adjustment of the cathode (7) is performed such that the rectifier (5) operates on average with a drive level of, for example, 25° electrical, independently of the secondary voltage of the furnace transformer (2) and of the desired current value ($i_{1soll}$) that has been set.

The frequencies to be suppressed by the bandpass filter (16) comprise frequencies in the range of 0.5 Hz–20 Hz.

Controlling to a constant drive level at the rectifier (5) results in a constant average power factor in the feeding AC system (1). The power of an operating point is determined very easily by selecting a voltage level of the furnace transformer (2) and stipulating the intensity of the direct current.

If it is desired to use a voltage level of the furnace transformer (2) to operate different operating points or a variable power, the desired current value ($i_{1soll}$) is appropriately prescribed. Lower powers are certainly obtained in the case of a reduced current but a drive level at the rectifier (5) which remains the same. However, the arc (10) becomes longer because of the lower voltage losses in the AC system (1). However, in the case of lower powers the furnace process also requires shorter arcs (10). In order to achieve this, when there is a change in the desired current value ($i_{1soll}$) a corresponding new desired value can also be prescribed simultaneously for the drive level of the rectifier (5). Provided for this purpose is a function generator (9) which, as indicated by dashes in FIG. 1, instead of the rectifier manipulated variable signal ($\alpha_{1ist}$), prescribes the electrode controller reference input variable signal ($\alpha_{soll}$) as a function of the desired current value ($i_{soll}$). It is therefore also possible to enlarge the power range.

Figure 2:
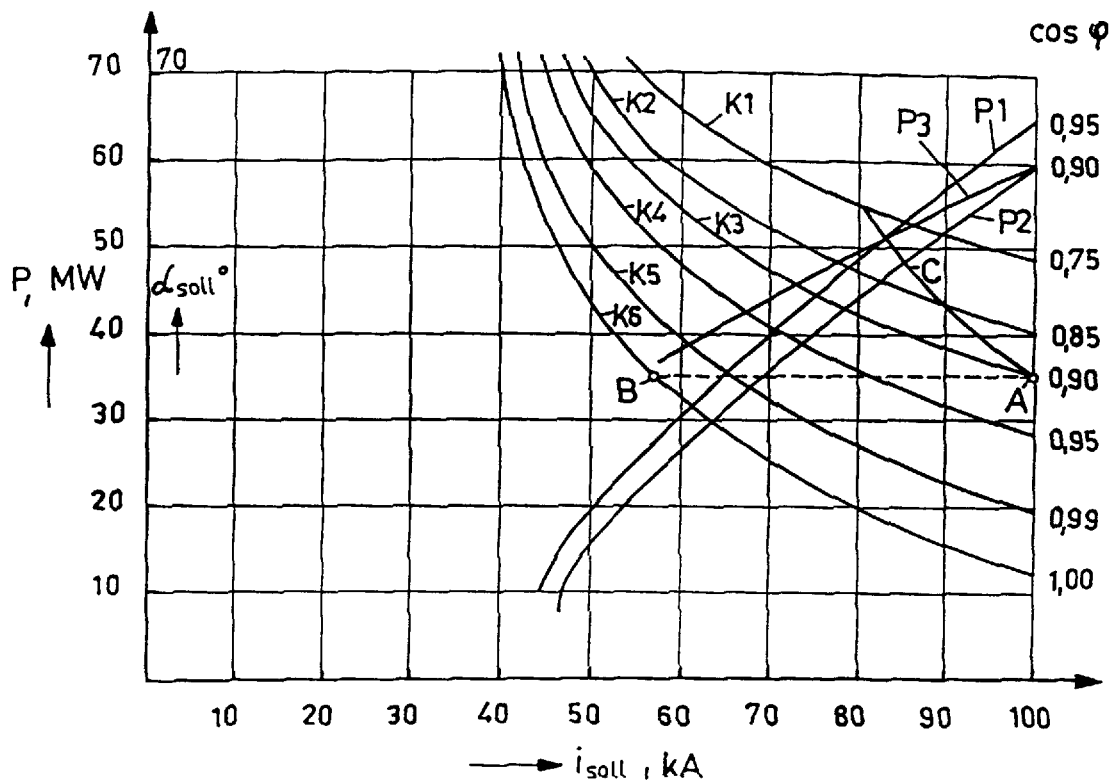
FIG. 2 shows a characteristic diagram for electrode controller reference input variable signals as a function of desired current values for different power factors.

FIG. 2 shows functions, realized by means of the function generator (9), corresponding to curves (K1–K6) which represent the electrode controller reference input variable signal ($\alpha_{soll}$) in electrical degrees as a function of the desired current value ($i_{soll}$) in kA for different power factors cos φ (0.75–1.00) as parameters. Also plotted on the ordinate is the active power (P) in MW drawn from the AC system (1). The numerical coincidence with the electrode controller reference input variable signal ($\alpha_{soll}$) is purely accidental.

The example represented in conjunction with FIG. 2 relates to an installation having an active power (P) of 60 MW for a direct current of 100 kA and an installed reactive power or correction power of 30 MVar. The installation is designed such that a power factor of cos φ=0.9, corresponding to an operating point (A), is produced in the case of 100 kA and a drive level of the rectifier (5) with a rectifier manipulated variable signal ($\alpha_{ist}$) of 35° in the feeding AC system (1). A connecting line (A–B) represented by dashes shows the bound for a minimum rectifier drive level. The curves (K1) and (K6) for cos φ=0.75 and 1.0 can likewise be regarded as a bound. One curve (C) corresponds to a drive level of the rectifier (5) in which a constant reactive power is drawn from the AC system (1) in accordance with the operating point (A); it is therefore a limit for maximum system reactive power. The function $\alpha_{soll}=f(i_{soll})$ is thus to lie in the region thus bounded, and preferably to correspond to the curve (K3) for cos φ=0.9.

If the drive level of $\alpha_{soll}=35°$ were maintained and the current progressively reduced from 100 kA to 60 kA, in accordance with one active power curve (P3) there would be a move from an active power of 60 MW to one of 38 MW for a cos φ≈1. This is a good 60% of the maximum power.

If it is prescribed that $\alpha_{soll}=f(i_{soll})$, all the operating points being operated, for example, with cos φ=0.9 in accordance with the curve (K3), the control angle ($\alpha_{soll}$) of 65° is required at 50 kA, the result thereby being an active power (P) of 15 MW in accordance with an active power curve (P2), and thus still 25% of the maximum power. A further active power curve (P1) holds for cos φ=0.95 (constant).

Figure 3:
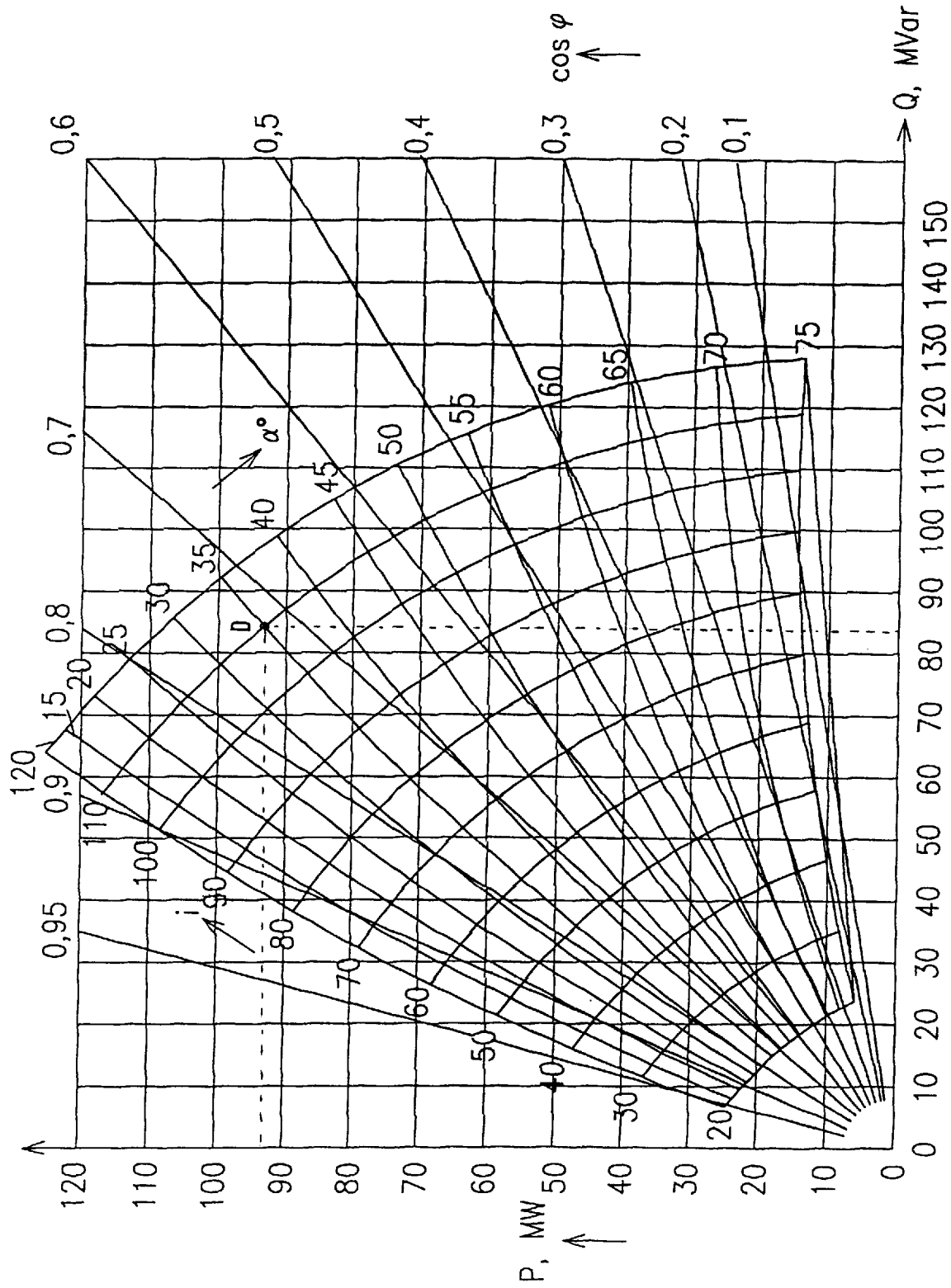
FIG. 3 shows a characteristic diagram for determining the desired reactive power of a DC arc furnace and for the desired ignition angle of a rectifier as a function of a desired reactive power and desired current intensity of the DC arc furnace, or for determining the desired current intensity as a function of reactive power and ignition angle.

FIG. 3 shows functions realized by means of function generators (25) and (25'), the active power (P) in MW being plotted on the ordinate and the reactive power (Q) in MVar being plotted on the abscissa. Specified on the diagram at the right and at the top are the values for cos φ of 0.2–0.95, on circular arc segments about the zero point current values (i) in kA of 20 kA–120 kA, and on the outside on the 120 kA circular arc segment values for the ignition angle ($\alpha$) in electrical degrees of 15°–75° at the end of curves which lead in the direction of the center of coordinates. For example, for an operating point (D) the reactive power (P) is 93 MW, the active power (Q) 84 MVar, the direct current (i) 110 kA, and the ignition angle ($\alpha$) 35°.

If, by means of operating staff or a higher-order controller (not represented), the function generator (25) is prescribed on the input side a desired active power ($P_{soll}$) and a desired current value ($i_{soll}$), FIG. 1, the function generator (25) makes available on the output side the values, associated therewith in accordance with FIG. 3, for the desired reactive power ($Q_{soll}$) and for the desired ignition angle value ($\alpha_{1soll}$). The value for the desired reactive power ($Q_{soll}$) is fed to a reactive power controller (23) and the value for the desired ignition angle value ($\alpha_{1soll}$) is fed to the function generator (25') and the non-negating inputs of the summers (17) and (17') as desired values for the electrode controllers (18) and (18') of the electrode assemblies (S1) and (S2).

Non-negating inputs of a summer (22) are fed reactive powers ($Q_1$, $Q_2$), detected by reactive power detectors (not represented), of the electrode assemblies (S1, S2), and a negating input is fed a compensation reactive power ($Q_4$) of the capacitor, connected to the AC system (1), or of a capacitor bank (4). The aggregate signal of the summer (22) is fed to the input of the reactive power controller (23), which on the output side supplies a manipulated variable ($Q_R$) to a non-negating input of a summer (24). A further non-negating input of the summer (24) is fed the value of the reactive power ($Q_2$); on the output side, it is connected to an input of the function generator (25'), which generates the same family of functions as the function generator (25) and, on the output side, transmits a desired current value ($i_{2soll}$) to the input of a summer (13') and, if appropriate, to the input of a function generator (9') which generates the same function as the function generator (9). Its output signal is the desired ignition angle value ($\alpha_{soll}$), which, instead of the desired ignition angle value ($\alpha_{1soll}$) from the output of the function generator (25), is supplied to a non-negating input of a summer (17').

Instead of the desired ignition angle value ($\alpha_{1soll}$) the function generator (25') can be supplied on the input side with the value, multiplied by 0.5, of the desired current value ($i_{soll}$) via a summing amplifier (26) with a factor input of 0.5. The function generator (25') then supplies on the output side a desired ignition angle value ($\alpha_{2soll}$) which is fed to the summer (17') at a non-negating input instead of the desired ignition angle value ($\alpha_{1soll}$).

It is important that the total reactive power of the installation is kept constant in order to avoid flicker phenomena. This means in the case of constant compensation reactive power ($Q_4$) that the sum $Q_1+Q_2$ must be constant.

In the case of the electrode assembly (S1), operating points are used to control a prescribable desired DC voltage and a prescribable desired current value ($i_{1soll}$). The resulting reactive power ($Q_1$) is determined. Depending on the selected operating point and the known conditions of the AC system (1), a desired reactive power ($Q_{soll}$) is prescribed via the function generator (25) and the desired reactive power ($Q_2$) of the electrode assembly (S2) is determined. The controlled variables of desired ignition angle value $\alpha_{2soll}=\alpha_{1soll}$ and spacing (d) between the cathode (7) and melting bath (11), which are required in order to generate the desired reactive power ($Q_{soll}$), can be calculated from the known installation parameters. In this case, the desired operating point of the desired current value ($i_{soll}$) is used as second interpolation value. In order to reduce process influences of the electrode assembly (S2), the actual reactive power ($Q_2$) is determined and fed back to the electrode controller (18') for correction. In this case, the inductances of the electrode assembly (S2) are used for power-factor correction.

In the melting mode, the two cathodes (7) and (7') melt scrap (not represented) in the DC arc furnace (8) and in the process generate a specific reactive power $Q_1+Q_2$. Scrap breaks in at the cathode (7) and thereby suddenly shortens the arc (10). The current control keeps the direct current ($i_{1ist}$) constant and varies the rectifier manipulated variable signal ($\alpha_{1ist}$) correspondingly. The resulting reactive power fluctuation can already be calculated at this instant. It can be calculated on the basis of the present operating point at the cathode (7'), which new operating point has to be set here in order to generate a change in reactive power of opposite sign so that the sum of reactive power remains constant.

It goes without saying that the DC arc furnace (8) can also be operated with more than 2 cathodes (7, 7'). At least one electrode assembly (S1, S2) is used for power-factor correction.

Obviously, numerous modifications and variations of the present invention are possible in light of the above teachings. It is therefore to be understood that within the scope of the appended claims, the invention may be practiced otherwise then as specifically described herein.

What is claimed as new and desired to be secured by Letters Patent of the United States is:

1. A method for stabilizing an AC network against reactive load fluctuations of at least one electric load, comprising:
    a) controlling a current flowing through said electric load to a desired reactive current value by a current controller;
    b) controlling a reactive power caused by said load to a desired reactive-power value by means of a power-factor controller in a power-factor control loop which contains said load as a controlled system;
    c) wherein said step of controlling said current to said desired reactive current value uses at least one power converter and uses at least two current control loops with separate current controllers which contain said load as a controlled system;
    d) controlling at least a first one of the at least two current control loops independently of the reactive power of said load; and
    e) controlling at least another of said at least two current control loops as a function of the reactive power of said load.

2. The method as claimed in claim 1, wherein said at least one electric load is a DC arc furnace, and wherein a spacing of a movable electrode of said DC arc furnace from a surface of a melting bath of said DC arc furnace is controlled as a function of an output signal used to control said reactive power.

3. A power factor correction device comprising:
    a) at least one electrical load which causes electric load fluctuations;
    b) being operationally connected to an AC system feeding said load via at least one first power converter;
    c) a reactive power controller;
    d) at least two current control systems, each with a current controller that contains the load as an actuator;
    e) at least one of the two current control systems is being operatively connected to an output side of the at least one power converter and being separate from the reactive power controller; and
    f) at least another of the two current control systems being operationally connected, on an input side, to the reactive power controller.

4. The power factor correction device as claimed in claim 3, wherein,
    a) said load is a DC arc furnace having at least two movable electrodes;
    b) each said movable electrode is provided a separate electrode-adjusting
    c) which is operatively connected, on an input side, to an electrode controller; and
    d) at least one of said electrode controllers being operatively connected, on its input side, to reactive power controller.

* * * * *